United States Patent
Kishita

(10) Patent No.: US 9,514,587 B2
(45) Date of Patent: Dec. 6, 2016

(54) VEHICLE LOCK CONTROLLER

(71) Applicants: AUTONETWORKS TECHNOLOGIES, LTD., Yokkaichi, Mie (JP); SUMITOMO WIRING SYSTEMS, LTD., Yokkaichi, Mie (JP); SUMITOMO ELECTRIC INDUSTRIES, LTD., Osaka-shi, Osaka (JP)

(72) Inventor: Yuri Kishita, Yokkaichi (JP)

(73) Assignees: AUTONETWORKS TECHNOLOGIES, LTD., Mie (JP); SUMITOMO ELECTRIC INDUSTRIES, LTD., Osaka (JP); SUMITOMO WIRING SYSTEMS, LTD., Mie (JP)

(*) Notice: Subject to any disclaimer, the term of this patent is extended or adjusted under 35 U.S.C. 154(b) by 0 days.

(21) Appl. No.: 14/650,483

(22) PCT Filed: Dec. 5, 2013

(86) PCT No.: PCT/JP2013/082680
§ 371 (c)(1),
(2) Date: Jun. 8, 2015

(87) PCT Pub. No.: WO2014/088061
PCT Pub. Date: Jun. 12, 2014

(65) Prior Publication Data
US 2015/0332530 A1    Nov. 19, 2015

(30) Foreign Application Priority Data
Dec. 7, 2012  (JP) ................................. 2012-268266

(51) Int. Cl.
| | |
|---|---|
| *G07C 9/00* | (2006.01) |
| *E05B 47/00* | (2006.01) |
| *B60R 25/24* | (2013.01) |
| *E05B 49/00* | (2006.01) |

(52) U.S. Cl.
CPC ......... *G07C 9/00182* (2013.01); *B60R 25/245* (2013.01); *E05B 47/0001* (2013.01); *E05B 49/00* (2013.01); *E05B 2047/005* (2013.01); *Y10T 70/5973* (2015.04)

(58) Field of Classification Search
CPC ............ G07C 9/00182; B60R 25/245; E05B 47/0001; E05B 49/00
See application file for complete search history.

(56) References Cited

U.S. PATENT DOCUMENTS 6,573,615 B1    6/2003  Asakura et al.
(Continued)

FOREIGN PATENT DOCUMENTS

| JP | 3372228 B2 | 1/2003 |
|---|---|---|
| JP | 2007-146501 A | 6/2007 |
| JP | 2008-088737 A | 4/2008 |

OTHER PUBLICATIONS

Feb. 18, 2014 International Search Report issued in International Application No. PCT/JP2013/082680.

*Primary Examiner* — Leon Flores
(74) *Attorney, Agent, or Firm* — Oliff PLC

(57) ABSTRACT

There is provided a vehicle lock controller capable of enhancing the security performance of a vehicle by automatically locking at least one door of the vehicle in an appropriate time. A human detection sensor is disposed on a vehicle, and a vehicle door lock controller is configured to detect the presence of a person around the vehicle based on an output signal of the human detection sensor. The vehicle door lock controller is provided with a short-range wireless communicator for wirelessly communicating with a wireless communication device within a short range and a long-range wireless communicator for wirelessly communicating with the wireless communication device within a long range. The vehicle door lock controller sets a timeout period before the at least one door of the vehicle is automatically locked after being unlocked, depending on whether or not communication exists between these wireless communicators and the wireless communication device.

7 Claims, 8 Drawing Sheets

(56) References Cited

U.S. PATENT DOCUMENTS

| | | | |
|---|---|---|---|
| 2007/0038344 A1* | 2/2007 | Oota | B60R 25/2009 701/49 |
| 2007/0109093 A1 | 5/2007 | Matsubara et al. | |
| 2007/0162191 A1 | 7/2007 | Matsubara et al. | |
| 2009/0033459 A1 | 2/2009 | Ichihara | |

* cited by examiner

| Long-range wireless communication | Short-range wireless communication | Detection of a person | Security level | Timeout period |
|---|---|---|---|---|
| Established | Established | Detected | Low | Long |
| | Established | Not detected | Middle | Middle |
| | Not established | Detected | High | Short |
| | Not established | Not detected | No unlocking | |
| Not established | | | | |

FIG. 4

| Short-range wireless communication | | Unlocking and automatic locking of doors |
|---|---|---|
| Driver's seat | Other seat | |
| Established | Not established | Driver side door |
| Established | Established | All doors |
| Not established | Established | |
| Not established | Not established | |

FIG. 8

VEHICLE LOCK CONTROLLER

BACKGROUND

The present disclosure relates to a vehicle lock controller for controlling locking and unlocking of vehicle doors.

Conventionally, a system for locking/unlocking (securing/releasing) vehicle doors according to the operation performed on an operation unit provided on a wireless communication device carried by a user has been in widespread use. Such a wireless communication device is provided, for example, in the form of a device integrally formed with the vehicle key or a separate key-ring type device. A vehicle lock controller, for example, in the form of a body ECU (Electronic Control Unit) provided on the vehicle communicates wirelessly with the wireless communication device to lock/unlock the doors. Certain vehicle lock controllers have the function of automatically locking the doors after a predetermined time has elapsed if the doors were unlocked in response to an operation performed on the wireless communication device.

JP 2008-88737 describes a vehicle door lock controller (vehicle lock controller) that locks the doors of a vehicle if no door opening is detected within a predetermined timeout period after the doors were unlocked based on a user operation. This vehicle door lock controller detects the location of the vehicle when the user unlocks the doors and sets the length of the timeout period based on the detected location of the vehicle. When the vehicle door lock controller receives a door unlock request from the user within a predetermined time period after automatically locking the doors upon the lapse of the timeout period, the controller learns the location of the vehicle at that time as the location for which the timeout period should be extended.

SUMMARY

Although the vehicle door lock controller described in JP 2008-88737 detects the location of the vehicle based on information obtained from a GPS (Global Positioning System) or the like, GPS-based detection may not accurately detect the location of the vehicle. For example, such detection is unavailable in locations, such as underground car parks, multistorey parking spaces, or the like, where GPS radio waves cannot be received. As the location of the vehicle needs to be detected every time the doors are unlocked, the power consumption of the vehicle increases when the engine is not running.

As the vehicle door lock controller described in JP 2008-88737 is configured to determine the length of the timeout period based on the detected location of the vehicle and what is learned by the controller based on the unlock request after door locking, the determination of the length of the timeout period does not take into consideration whether or not the user is actually around the vehicle. This creates the problem of providing a low level of security to the vehicle.

The embodiments of the present disclosure were made based on the foregoing circumstances, and it is an object thereof to provide a vehicle lock controller capable of enhancing the security performance of a vehicle by automatically locking the doors of the vehicle in an appropriate time.

A vehicle lock controller according to one aspect of the present disclosure comprises a short-range wireless communicator configured to communicate with a portable wireless communication device within a short range; a long-range wireless communicator configured to communicate with the wireless communication device within a long range, the long range being longer than the short range; a controller configured to lock or unlock at least one door of a vehicle in response to a lock or unlock request received from the wireless communication device; a detection device configured to detect the presence of a person around the vehicle; and a lock time setting device configured, if a request to unlock the at least one door is received from the wireless communication device, to set a lapse of time before the at least one door is locked, depending on whether or not (i) the short-range wireless communicator has communicated with the wireless communication device, (ii) the long-range wireless communicator has communicated with the wireless communication device, and (iii) a result of detection by the detection device, wherein the controller is configured such that, if the controller receives the unlock request from the wireless communication device, the controller unlocks the at least one door and then locks the at least one door after the lapse of time set by the lock time setting device.

Moreover, the vehicle lock controller according to one aspect of the present disclosure is characterized in that the lock time setting device: sets the lapse of time before the at least one door is locked to a long period if the short-range wireless communicator has communicated with the wireless communication device; sets the lapse of time before the at least one door is locked to a medium-length period shorter than the long period if (i) the short-range wireless communicator has not communicated with the wireless communication device, (ii) the long-range wireless communicator has communicated with the wireless communication device, and (iii) the detection device has not detected a person; and sets the lapse of time before the at least one door is locked to a short period shorter than the medium period if (i) the short-range wireless communicator has not communicated with the wireless communication device, (ii) the long-range wireless communicator has communicated with the wireless communication device, and (iii) the detection device has detected a person.

Moreover, the vehicle lock controller according to one aspect of the present disclosure is characterized in that the range within which the detection device detects a person is narrower than the long range of the long-range wireless communicator.

Moreover, the vehicle lock controller according to one aspect of the present disclosure is characterized in that the vehicle lock controller further comprises a setting reception device configured to receive a setting of whether or not to lock the at least one door after the lapse of time; and the controller is further configured to: not lock the at least one door, even after the lapse of time, if the setting reception device has received a setting to not lock the at least one door; and lock the at least one door after the lapse of time if the setting reception device has received a setting to lock the at least one door.

Moreover, the vehicle lock controller according to one aspect of the present disclosure is characterized in that the vehicle lock controller further comprises a door open determination device configured to determine whether or not a door of the vehicle has been opened (i) after the controller unlocked the at least one door in response to the unlock request from the wireless communication device and (ii) before the lapse of time set by the lock time setting device; and the controller is configured to not lock the at least one door after the lapse of time if the door open determination device determines that the door of the vehicle has been opened.

Moreover, the vehicle lock controller according to one aspect of the present disclosure is characterized in that the short-range wireless communicator includes a plurality of antennas configured to transmit and receive a wireless signal; each of the plurality of antennas is disposed in a different location of the vehicle; and the controller is configured to determine which of a plurality of doors of the vehicle is to be controlled depending on through which of the plurality of antennas short-range wireless communication has been carried out between the short-range wireless communicator and the wireless communication device.

Moreover, the vehicle lock controller according to one aspect of the present disclosure is characterized in that the plurality of antennas are provided on the plurality of doors of the vehicle; and depending on whether or not short-range wireless communication has been carried out between the short-range wireless communicator and the wireless communication device through a said antenna provided on a driver side door of the vehicle, the controller is configured to determine whether only the driver side door or the plurality of doors are to be controlled.

In one aspect of the present disclosure, for example, an ultrasonic sensor, an infrared sensor, or the like is disposed on a vehicle so that a vehicle lock controller detects the presence of a person around the vehicle based on information obtained from the sensor. Moreover, the vehicle lock controller is provided with a short-range wireless communication unit for wirelessly communicating with a wireless communication device within a short range and a long-range wireless communication unit for wirelessly communicating within a long range. If a door unlock operation is performed, the vehicle lock controller determines the distance from the vehicle to the wireless communication device (i.e., the user carrying this) depending on whether or not wireless communication exists between these communication units and the wireless communication device. The vehicle lock controller sets time before the doors of the vehicle are automatically locked after being unlocked depending on the result of detection of a person around the vehicle and a distance based on whether or not communication exists with the wireless communication device. This allows for proper setting of time before locking the doors depending on whether or not the user or a different person is around the vehicle.

If the short-range wireless communication unit has communicated with the wireless communication device, the vehicle lock controller determines that the user is at a short distance from the vehicle and sets the time before door locking to a long period. This enhances the convenience for the user.

Moreover, if the short-range wireless communication unit has not communicated with the wireless communication device but the long-range wireless communication unit has, the vehicle lock controller determines that the user is at a long distance from the vehicle and sets the time before door locking to a medium-length or short period depending on the result of detection of a different person. In this case, the vehicle lock controller sets the time before door locking to a medium-length period if a different person is not detected around the vehicle, and the vehicle lock controller sets the time before door locking to a short period if a different person is detected. This can enhance the security performance of the vehicle.

Moreover, the range of detection of a person around the vehicle is narrower than the wireless communication range of the long-range wireless communication unit.

Moreover, in one aspect of the present disclosure, the vehicle lock controller receives a setting for whether or not to automatically lock the doors. If a setting for not automatically locking the doors is received, the vehicle lock controller does not lock the doors even after a predetermined time has elapsed from unlocking of the doors. Due to the above, by making a setting for not automatically locking the doors, the user can smoothly transport luggage or the like, for example, when the user wishes to keep the doors of the vehicle unlocked for a long time to transport luggage or the like.

Moreover, in one aspect of the present disclosure, if a door of the vehicle is opened by the user after the doors were unlocked according to an operation performed on an operation unit of the wireless communication device, the vehicle lock controller does not automatically lock the doors even after the predetermined time has elapsed. This increases the convenience for the user as the doors are prevented from being locked when the user is likely to be in the vicinity of the vehicle.

Moreover, in one aspect of the present disclosure, a plurality of antennas is provided for short-range wireless communication so as to communicate with the wireless communication device, for example, by using the antennas successively. The communication range of short-range wireless communication by each antenna may be different by disposing the plurality of antennas in different locations of the vehicle. This allows for determination of the location the wireless communication device depending on through which antenna short-range wireless communication has been established. For example, by disposing the plurality of antennas in the doors of the vehicle, it is possible to determine which door the user carrying the wireless communication device is located close to.

In this way, the vehicle lock controller determines which door(s) is to be controlled depending on through which antenna short-range wireless communication has been established. For example, if short-range wireless communication has been established though the antenna provided on the driver side door, the driver side door can be selected for unlocking and subsequent automatic locking. This can enhance the security performance of the vehicle as it is possible to control the door(s) appropriate for the location of the user.

The vehicle door lock controller according to one aspect of the present disclosure sets a time from when the doors of a vehicle are unlocked to when they are automatically locked depending on the result of detection of a person around the vehicle and whether or not the short-range wireless communication unit and the long-range wireless communication unit have communicated with the wireless communication device. As this provides for proper setting of time before locking depending on whether or not the user or a different person is around the vehicle, the security performance of the vehicle can be improved. Moreover, this configuration is capable of reducing the power consumption compared with a case in which the time is set by locating the vehicle with a GPS or the like.

BRIEF DESCRIPTION OF THE DRAWINGS

FIG. 4 is a table for describing the timeout periods from door unlocking to automatic locking.

FIG. 8 is a table for describing the door lock control performed by the vehicle door lock controller according to Embodiment 2.

DETAILED DESCRIPTION OF EMBODIMENTS

Embodiment 1

Figure 1:
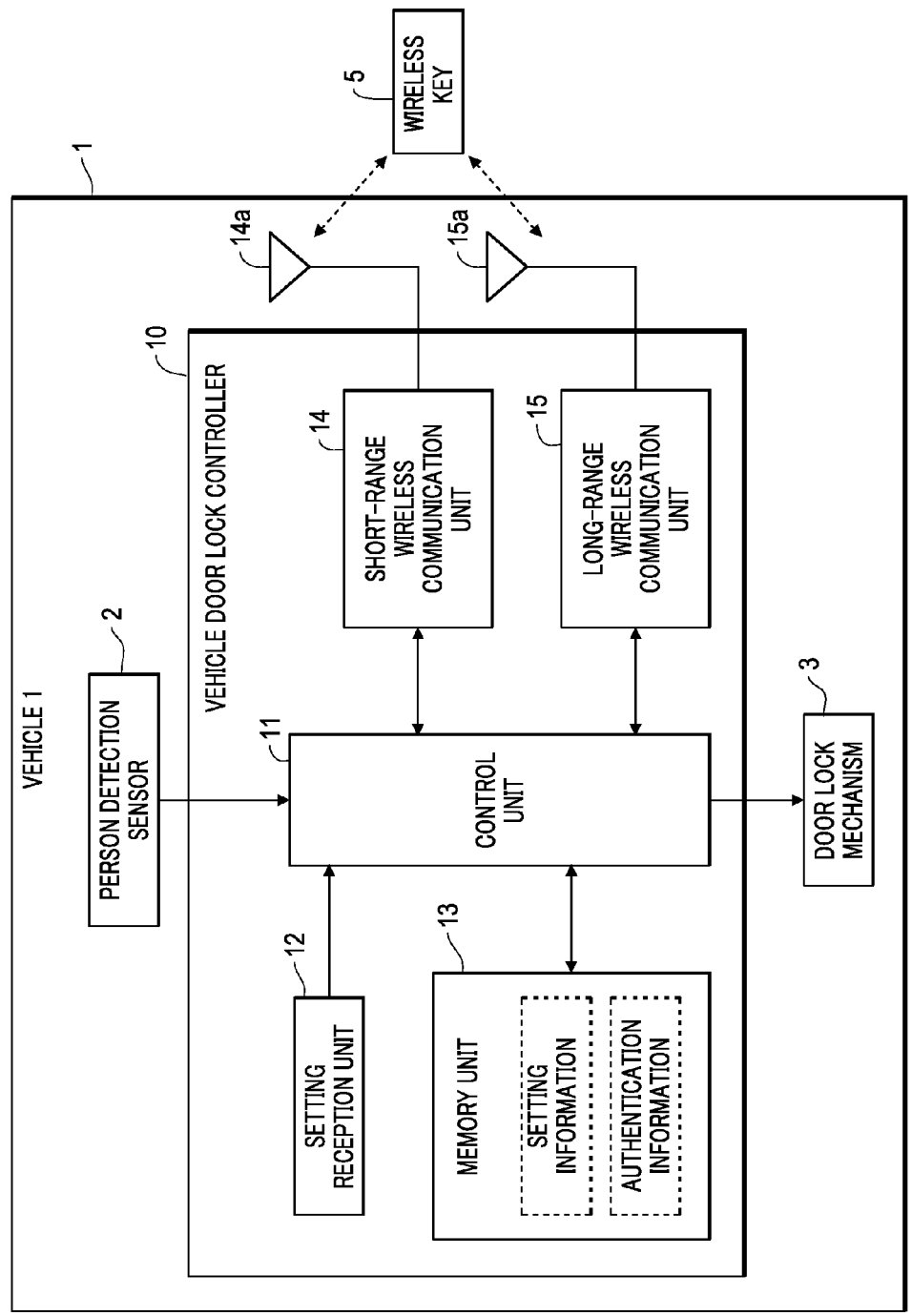
FIG. 1 is a block diagram showing the configuration of the door lock system according to one embodiment.
Figure 2:
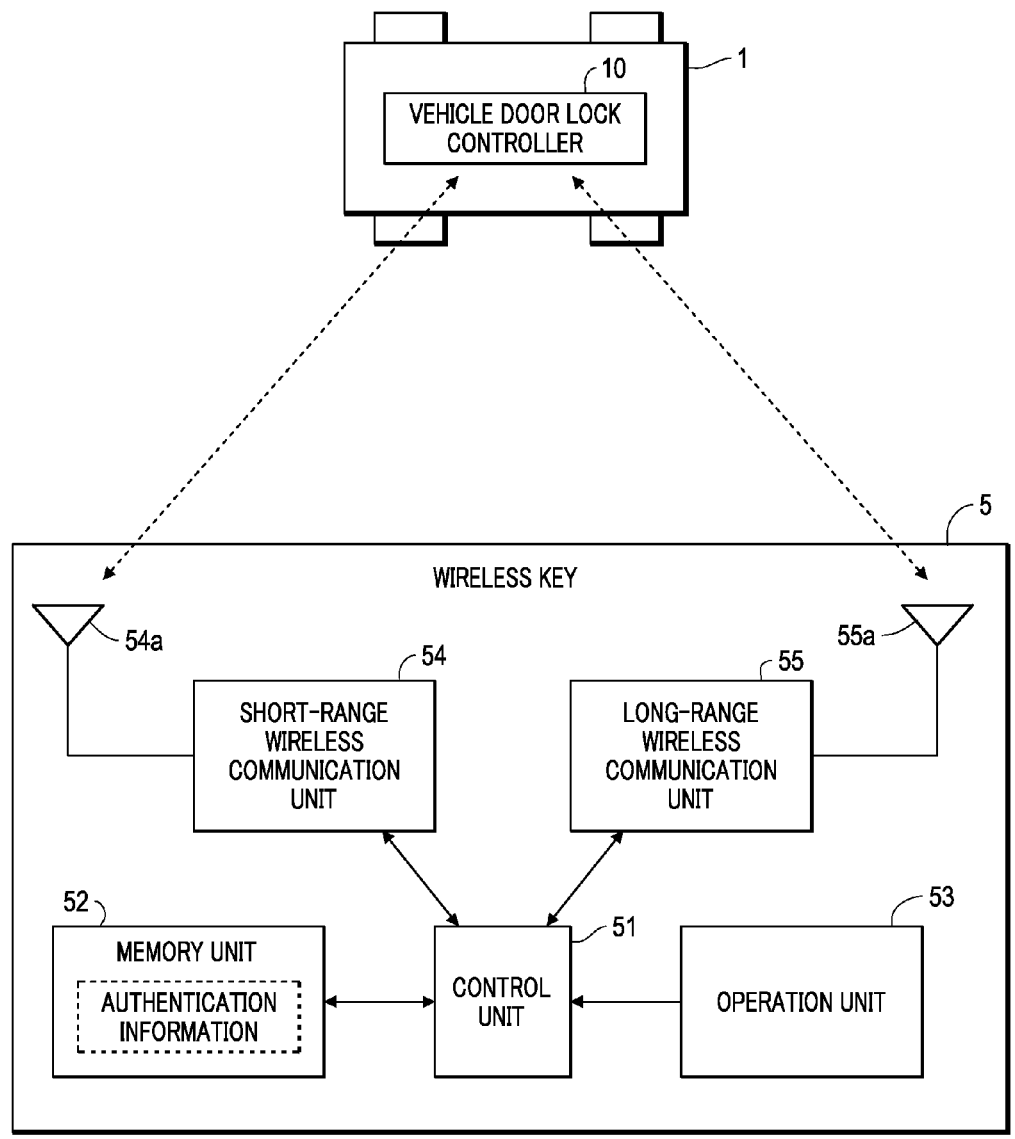
FIG. 2 is a block diagram showing the configuration of the door lock system according to this embodiment.

Embodiments of the present disclosure will be described hereinafter with reference to the drawings. FIGS. 1 and 2 are block diagrams showing the configuration of the door lock system according to one embodiment. The door lock system according to this embodiment includes a vehicle door lock controller (vehicle lock controller) 10 aboard a vehicle 1 and a portable wireless key 5 carried by a user. The vehicle door lock controller 10 and the wireless key 5 are capable of transmitting and receiving information through wireless communication. The vehicle door lock controller 10 is a device for locking/unlocking one or more doors (not shown) of the vehicle 1 and, for example, may be a body ECU. The vehicle door lock controller 10 locks/unlocks doors by controlling the operation of the door lock mechanism 3 based on the operation performed by the user on a lock operation unit (not shown) provided for each door of the vehicle 1 or on the wireless key 5.

The vehicle door lock controller 10 is configured to include a control unit 11, a setting reception unit 12, a memory unit 13, a short-range wireless communication unit 14, a long-range wireless communication unit 15, and so on. The control unit 11 is constituted by an arithmetic processing unit, such as a CPU (Central Processing Unit), an MPU (Micro Processing Unit), or the like, and performs operations to control the units of the vehicle door lock controller 10 by reading out and executing the programs (not shown) stored in the memory unit 13 or the like.

The setting reception unit 12 is constituted by the buttons, switches, touch panel, and the like provided in the areas around the driver's seat of the vehicle 1 and receives settings/operations concerning door locking/unlocking. In this embodiment, it receives on/off settings of the auto-lock function (described in detail below) for the doors of the vehicle 1. The setting reception unit 12 may, for example, utilize the automotive navigation system aboard the vehicle 1. The setting reception unit 12 notifies the control unit 11 of the setting it has received.

The memory unit 13 is constituted by a nonvolatile memory device, such as an EEPROM (Electrically Erasable Programmable Read Only Memory), flash memory, or the like and stores a variety of information therein. For example, the memory unit 13 is given the setting/operations received by the setting reception unit 12 and stores the setting information therein. Moreover, the memory unit 13, for example, stores the authentication information required for authentication processing performed with the wireless key 5. The control unit 11 is capable of reading out information stored in the memory unit 13 and store necessary information in the memory unit 13.

The short-range wireless communication unit 14 is connected with an antenna 14a disposed at an appropriate location of the vehicle 1 to wirelessly communicate with the wireless key 5 using, for example, LF (Low Frequency) band waves. The communication range of the short-range wireless communication unit 14 is set to be a shorter range from the vehicle 1 than that of the long-range wireless communication unit 15. The short-range wireless communication unit 14 provides information received from the wireless key 5 to the control unit 11 and transmits information provided by the control unit 11 to the wireless key 5.

The long-range wireless communication unit 15 is connected with an antenna 15a disposed at an appropriate location of the vehicle 1 to wirelessly communicate with the wireless key 5 using, for example, UHF (Ultra High Frequency) band waves. The communication range of the long-range wireless communication unit 15 is set to be a longer range from the vehicle 1 than that of the short-range wireless communication unit 14. The long-range wireless communication unit 15 provides information received from the wireless key 5 to the control unit 11 and transmits information provided by the control unit 11 to the wireless key 5.

Also mounted at an appropriate location of the vehicle 1 is a human detection sensor 2 that detects the presence of a person around the vehicle 1. A sensor configured to detect a person by outputting, for example, supersonic waves, infrared light, or the like and detecting the reflected waves may be used as the human detection sensor 2. In addition to this configuration, the human detection sensor 2 may also be configured to detect infrared light emitted by a person. For example, the human detection sensor 2 may be configured to shoot the area around the vehicle 1 with a camera to detect a person or may also have a still different configuration. The human detection sensor 2 outputs an output signal indicating whether or not a person is present to the vehicle door lock controller 10, and the control unit 11 of the vehicle door lock controller 10 samples the output signal of the human detection sensor 2 to obtain the result of the detection of the presence of a person.

When the control unit 11 of the vehicle door lock controller 10 receives a lock/unlock request from the wireless key 5 through wireless communication, the control unit 11 locks/unlocks the doors of the vehicle 1 by outputting a control signal to the door lock mechanism 3 of the vehicle 1. The door lock mechanism 3 is provided with a mechanical mechanism for locking/unlocking each door of the vehicle 1 and a motor, actuator, or the like to electrically operate this mechanical mechanism. The control unit 11 locks/unlocks the doors by operating the motors, actuators, or the like of the door lock mechanism 3 in response to a request from the wireless key 5.

The wireless key 5 is used to lock/unlock the doors of the vehicle 1 and is sized to allow the user to carry it. The wireless key 5 is configured to include a control unit 51, a memory unit 52, an operation unit 53, a short-range wireless communication unit 54, a long-range wireless communication unit 55, and so on. The memory unit 52 is constituted by a non-volatile memory device, such as an EEPROM, and stores therein information, such as the authentication information required for authentication processing performed with the vehicle door lock controller 10 onboard the vehicle 1. The control unit 51 can read out information stored in the memory unit 52 and store necessary information in the memory unit 52.

The operation unit 53 is provided for receiving lock/unlock operations for the doors of the vehicle 1. The operation unit 53 may be provided, for example, with a lock button and an unlock button for locking and unlocking the doors of the vehicle 1, respectively, or may be provided with a common button for alternately locking and unlocking the doors. Or the operation unit 53 may have some other configuration. The operation unit 53 receives lock/unlock operations from the user and notifies the control unit 51 of such operations.

The short-range wireless communication unit 54 is provided with an antenna 54a to communicate wirelessly with the vehicle door lock controller 10 using, for example, LF band waves. The short-range wireless communication unit 54 provides information received from the vehicle door lock controller 10 to the control unit 51 and transmits information provided by the control unit 51 to the vehicle door lock controller 10. The long-range wireless communication unit 55 is provided with an antenna 55a to communicate wirelessly with the vehicle door lock controller 10 using, for example, UHF band waves. The long-range wireless communication unit 55 provides information received from the vehicle door lock controller 10 to the control unit 51 and transmits information provided by the control unit 51 to the vehicle door lock controller 10.

Figure 3:
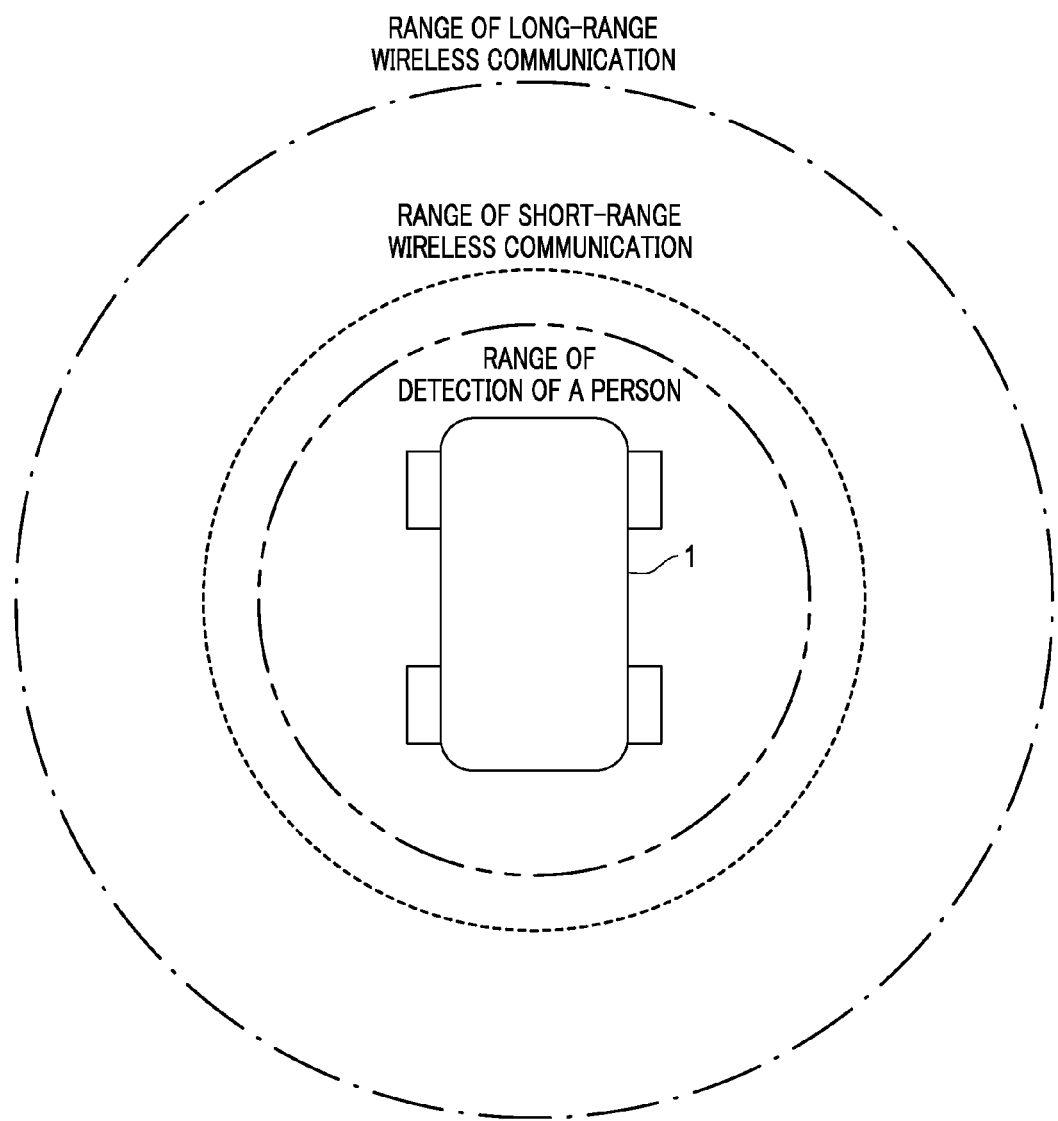
FIG. 3 is a schematic diagram for describing the ranges of wireless communication performed by a vehicle door lock controller.

FIG. 3 is a schematic diagram for describing the ranges of wireless communication performed by the vehicle door lock controller 10. The wireless communication range of the short-range wireless communication unit 14 of the vehicle door lock controller 10 is, for example, the range indicated by the broken-line circle around the vehicle 1 in FIG. 3. It should be noted that the wireless communication range of the short-range wireless communication unit 14 is, for example, a range of about several meters around the antenna 14a. The wireless communication range of the long-range wireless communication unit 15 is, for example, the range indicated by the dash-dot circle around the vehicle 1 in FIG. 3. It should be noted that the wireless communication range of the long-range wireless communication unit 15 is, for example, a range of about a dozen to dozens of meters around the antenna 15a.

Moreover, the range of detection by the human detection sensor 2 is, for example, the range indicated by the two-dot chain line circle around the vehicle 1 in FIG. 3. The range of detection by the human detection sensor 2 is a range of about several meters around where the human detection sensor 2 is positioned. It should be noted that although FIG. 3 shows an example in which the range of detection by the human detection sensor 2 is narrower than the wireless communication range of the short-range wireless communication unit 14, the range of detection by the human detection sensor 2 may be the same or larger than the wireless communication range of the short-range wireless communication unit 14. It should be noted, however, that in this embodiment, the range of detection by the human detection sensor 2 is narrower than the wireless communication range of the long-range wireless communication unit 15.

When a lock/unlock operation is performed on the operation unit 53 of the wireless key 5, the operation unit 53 notifies the control unit 51 of that operation. In response to the notification from the operation unit 53, the control unit 51 first attempts to wirelessly communicate with the vehicle door lock controller 10 of the vehicle 1 by causing the long-range wireless communication unit 55 to transmit a UHF-band signal from the antenna 55a. If the control unit 11 of the vehicle door lock controller 10 receives the wireless signal from the wireless key 5 at the long-range wireless communication unit 15, the control unit 11 causes the long-range wireless communication unit 15 to reply to the wireless key 5 and performs authentication processing as required, and then the control unit 11 locks/unlocks the doors by outputting a control signal to the door lock mechanism 3 according to the lock/unlock request from the wireless key 5.

If the control unit 11 of the vehicle door lock controller 10 according to this embodiment receives a request to unlock the doors from the wireless key 5 at the long-range wireless communication unit 15, the control unit 11 wirelessly communicates with the wireless key 5 through the short-range wireless communication unit 14 and determines the distance from the vehicle 1 to the wireless key 5 depending on whether or not wireless communication has been established. That is, if short-range wireless communication has been established between the control unit 11 and the wireless key 5 through the short-range wireless communication unit 14, the control unit 11 may determine that the wireless key 5 is located at a close distance from the vehicle 1, and if short-range wireless communication has not been established between the control unit 11 and the wireless key 5, the control unit 11 may determine that the wireless key 5 is located at a long distance from the vehicle 1. Moreover, at the same time, the control unit 11 determines whether or not a person is around the vehicle 1 by sampling the output signal of the human detection sensor 2.

If the doors of the vehicle 1 are unlocked according to an unlock request from the wireless key 5, the control unit 11 of the vehicle door lock controller 10 automatically locks the doors after the lapse of a predetermined timeout period. The control unit 11 sets a timeout period before performing automatic locking based on the distance from the vehicle 1 to the wireless key 5 and whether or not a person is around the vehicle 1.

FIG. 4 is a table for describing the timeout periods from door unlocking to automatic locking. If short-range wireless communication has been established between the control unit 11 and the wireless key 5 through the short-range wireless communication unit 14, the control unit 11 of the vehicle door lock controller 10 determines that the security level is low regardless of the result of detection by the human detection sensor 2 and sets the timeout period before automatic locking to a long period (for example, several tens of seconds to several minutes). Moreover, if short-range wireless communication has not been established between the control unit 11 and the wireless key 5 through the short-range wireless communication unit 14 and if no person is detected around the vehicle 1 by the human detection sensor 2, the control unit 11 determines that the security level is middle and sets the timeout period before automatic locking to a medium-length period (for example, over ten seconds to several tens of seconds). Moreover, if short-range wireless communication has not been established between the control unit 11 and the wireless key 5 through the short-range wireless communication unit 14 and if a person is detected around the vehicle 1 by the human detection sensor 2, the control unit 11 determines that the security level is high and sets the timeout period before automatic locking to a short period (for example, several seconds to less than twenty seconds). It should be noted that if long-range wireless communication has not been established between the control unit 11 and the wireless key 5 through the long-range wireless communication unit 15, the control unit 11 neither unlocks any door nor performs an operation for setting a timeout period.

If the control unit 11 of the vehicle door lock controller 10 receives an unlock request from the wireless key 5 at the long-range wireless communication unit 15, the control unit 11 sets a timeout period depending on whether or not wireless communication has been established between the control unit 11 and the wireless key 5 through the short-range wireless communication unit 14 and depending on the result of detection by the human detection sensor 2, and then the control unit 11 unlocks the doors of the vehicle 1 by outputting a control signal to the door lock mechanism 3. Subsequently, the control unit 11 clocks time with a timer and, when the set timeout period has elapsed, outputs a control signal to the door lock mechanism to lock the doors. It should be noted that if a door of the vehicle 1 is opened before the timeout period has elapsed, the control unit 11 does not perform automatic locking of the doors.

It should be noted that the vehicle door lock controller 10 receives at the setting reception unit 12 a setting for whether or not to automatically lock the doors and stores the received setting in the memory unit 13 as setting information. When a setting for not performing automatic door locking has been made (automatic door locking disabled), the control unit 11 of the vehicle door lock controller 10 does not automatically lock the doors, such as locking of the doors after the above-described setting of the timeout period and the lapse of the timeout period. When a setting for performing automatic door locking has been made (automatic door locking enabled), the control unit 11 automatically locks the doors as described above.

Figure 5:
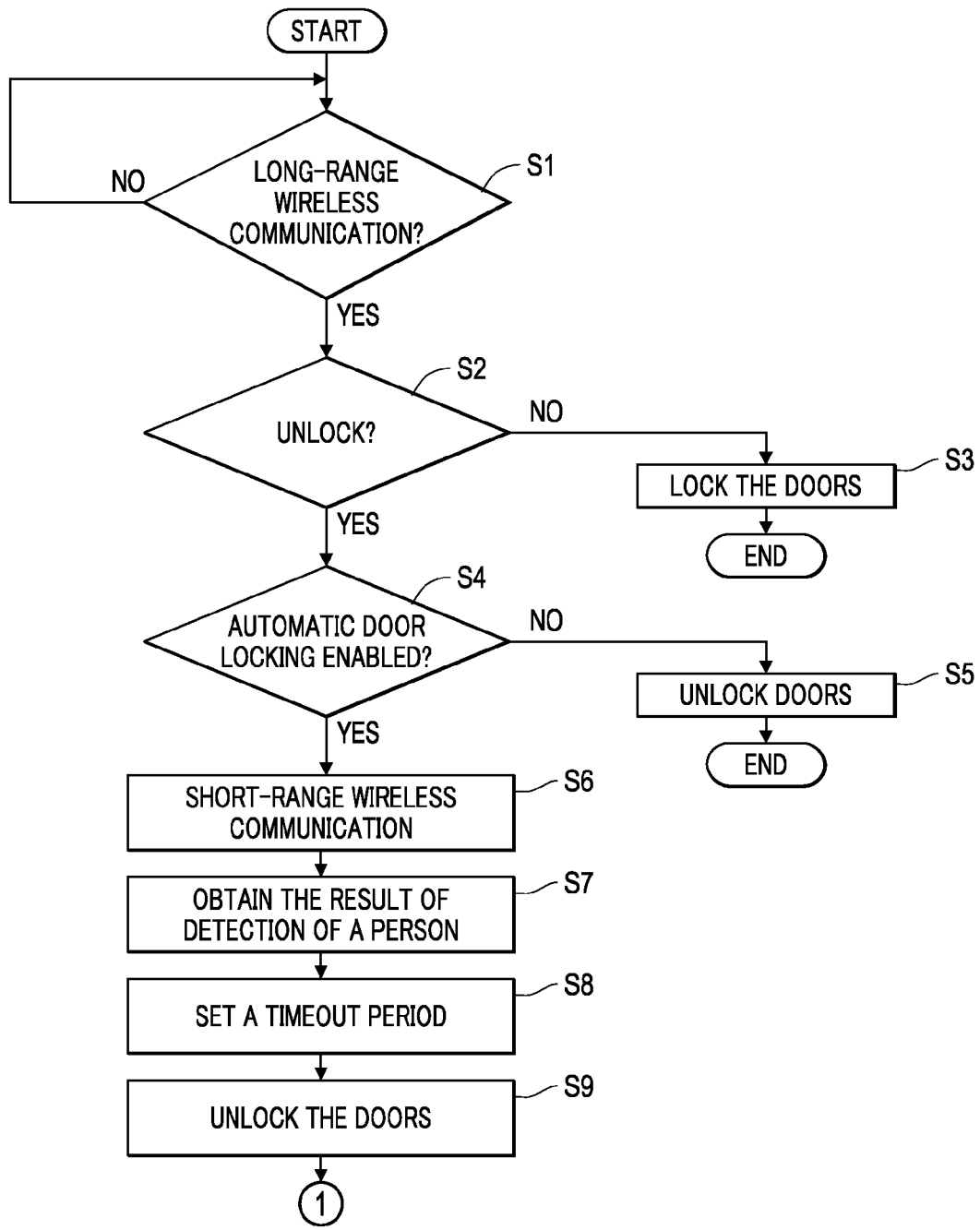
FIG. 5 is a flowchart showing the procedure performed by the vehicle door lock controller to control door locking/unlocking.
Figure 6:
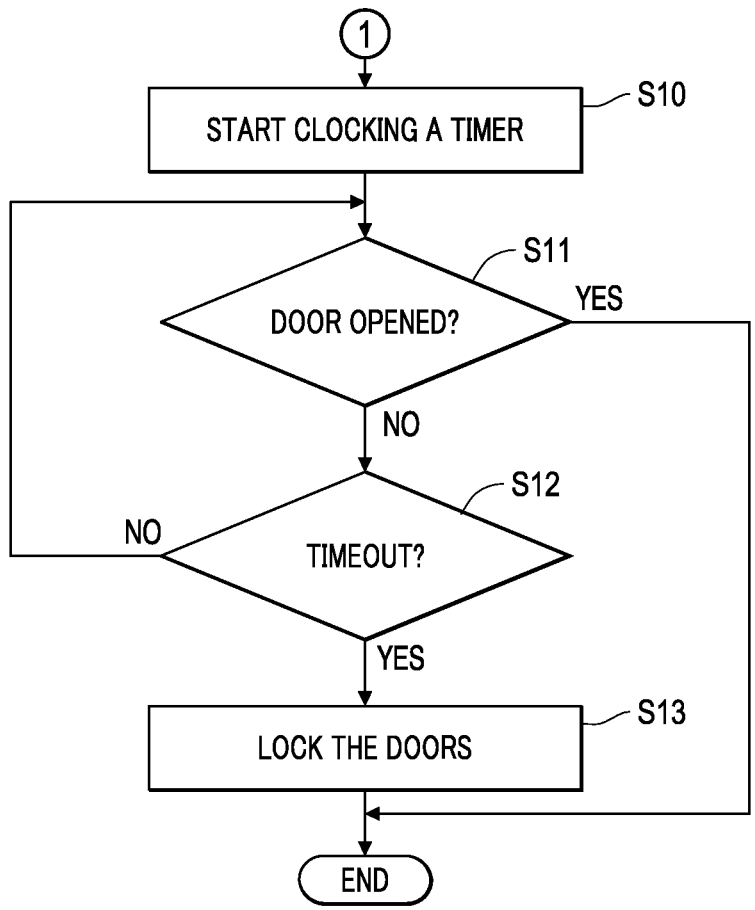
FIG. 6 is a flowchart showing the procedure performed by the vehicle door lock controller to control door locking/unlocking.

FIGS. 5 and 6 are flowcharts showing the procedure performed by the vehicle door lock controller 10 to control door locking/unlocking. The control unit 11 of the vehicle door lock controller 10 receives a wireless signal from the wireless key 5 at the long-range wireless communication unit 15 and determines whether or not long-range wireless communication has been established between the control unit 11 and the wireless key 5 (Step S1). It should be noted that establishment of long-range wireless communication includes meeting of conditions, such as successful authentication processing. If long-range wireless communication has not been established between the control unit 11 and the wireless key 5 (NO at S1), the control unit 11 stands by until long-range wireless communication is established.

If long-range wireless communication is established between the control unit 11 and the wireless key 5 (YES at S1), the control unit 11 determines whether or not the request from the wireless key 5 is for unlocking the doors (Step S2). If the request is not for unlocking, i.e., if it is for locking the doors (NO at S2), the control unit 11 locks the doors by outputting a control signal for locking the doors to the door lock mechanism 3 (Step S3) and terminates the process.

If the request from the wireless key 5 is for unlocking the doors (YES at S2), the control unit 11 reads out the setting information stored in the memory unit 13 and determines whether or not automatic door locking is enabled (Step S4). If automatic door locking is not enabled, i.e., if it is disabled (NO at S4), the control unit 11 unlocks the doors by outputting a control signal for unlocking the doors to the door lock mechanism 3 (Step S5) and terminates the process.

If automatic door locking is enabled (YES at S4), the control unit 11 communicates wirelessly with the wireless key 5 within a short range through the short-range wireless communication unit 14 (Step S6) to determine the distance to the wireless key 5. Additionally, the control unit 11 obtains the result of the detection of a person around the vehicle 1 by sampling the output signal of the human detection sensor 2 (Step S7). The control unit 11 sets a timeout period before automatic door locking based on whether or not short-range wireless communication has been established between the control unit 11 and the wireless key 5 through the short-range wireless communication unit 14 and on the result of the detection of a person (Step S8, see FIG. 4).

Next, the control unit 11 unlocks the doors by outputting a control signal for unlocking the doors to the door lock mechanism 3 (Step S9) and starts clocking by a timer (Step S10). Subsequently, the control unit 11 determines whether or not a door of the vehicle 1 has been opened (Step S11), and if a door has been opened (YES at S11), the control unit 11 terminates the process without automatically locking the doors.

If no door has been opened (NO at S11), the control unit 11 determines whether or not the timeout period set at Step S8 has elapsed based on the clocking by the timer (Step S12). If the timeout period has not elapsed (NO at Step S12), the control unit 11 returns the process to Step S11. If the timeout period has elapsed (YES at Step S12), the control unit 11 locks the doors by outputting a control signal for locking the doors to the door lock mechanism 3 (Step S13) and terminates the process.

In the door lock system configured as described above according to this embodiment, a human detection sensor 2 is disposed in the vehicle 1 and the vehicle door lock controller 10 detects the presence of a person around the vehicle 1 based on an output signal of the human detection sensor 2. Moreover, the vehicle door lock controller 10 is provided with a short-range wireless communication unit 14 for wirelessly communicating with the wireless key 5 within a short range and a long-range wireless communication unit 15 for wirelessly communicating with the wireless key 5 within a long range. If a door unlock operation is performed using the wireless key 5, the vehicle door lock controller 10 determines the distance from the vehicle 1 to the wireless key 5 depending on whether or not wireless communication exists between these communication units and the wireless key 5. The vehicle door lock controller 10 sets a timeout period before the doors of the vehicle 1 are automatically locked after being unlocked depending on the result of the detection of a person around the vehicle 1 and whether or not communication exists with the wireless key 5. This allows for proper setting of the timeout period before door locking depending on whether or not the user or a different person is around the vehicle 1, thus enhancing the security performance of the vehicle 1. Moreover, this configuration is capable of reducing the power consumption compared with a configuration for setting the timeout period by locating the vehicle 1 with a GPS or the like.

If the short-range wireless communication unit 14 has communicated with the wireless key 5, the vehicle door lock controller 10 determines that the user is at a short distance from the vehicle 1 and sets the timeout period before door locking to a long period. This increases the convenience for the user. Moreover, if the long-range wireless communication unit 15 has communicated with the wireless key 5 while the short-range wireless communication unit 14 has not communicated with the wireless key 5, and no person is detected around the vehicle 1, the vehicle door lock controller 10 determines that the user is located at a long distance from the vehicle 1 and sets the timeout period to a medium-length period. Moreover, if the long-range wireless communication unit 15 has communicated with the wireless key 5 while the short-range wireless communication unit 14 has not communicated with the wireless key 5, and a person is detected around the vehicle 1, the vehicle door lock controller 10 determines that a person other than the user is around the vehicle 1 and sets the timeout period to a short period. The above can enhance the security performance of the vehicle 1.

It should be noted that the vehicle door lock controller 10 receives a setting for whether or not to automatically lock the doors at the setting reception unit 12 and stores the received setting in the memory unit 13 as setting information. If automatic door locking is disabled, the vehicle door lock controller 10 does not lock the doors even after the timeout period has elapsed from unlocking of the doors. Due to the above, by making a setting for not automatically locking the doors, the user can smoothly transport luggage or the like, for example, when the user wishes to keep the doors of the vehicle 1 unlocked for a long time to transport luggage or the like.

Moreover, if a door of the vehicle 1 is opened after the doors were unlocked according to an operation performed on the operation unit 53 of the wireless key 5, the vehicle door lock controller 10 does not lock the doors even after the timeout period has elapsed since the doors were unlocked. This increases the convenience for the user as the doors are prevented from being locked when the user is likely to be in the vicinity of the vehicle 1.

It should be noted that although the vehicle door lock controller 10 is configured to include the short-range wireless communication unit 14 and the long-range wireless communication unit 15 in this embodiment, it is not limited to this. For example, a configuration may also suffice in which the wireless key 5 and the vehicle door lock controller 10 indirectly communicate with each other by causing a communication apparatus, such as one that is provided with a short-range wireless communication unit 14 and a long-range wireless communication unit 15, to communicate with the vehicle door lock controller 10. In other words, the vehicle door lock controller 10 may be configured as a system combining a plurality of apparatuses.

Moreover, although the memory unit 10 is configured to store in the memory unit 13 a setting received at the setting reception unit 12 as setting information, it is not limited to this. For example, a switch for switching between whether or not to automatically lock the doors may be disposed in the vicinity of the driver's seat so that the setting of this switch may be received as the setting for automatic locking. It should be noted that the communication ranges and the person detection range shown in FIG. 3 are only one example and not limited to this.

Embodiment 2

Figure 7:
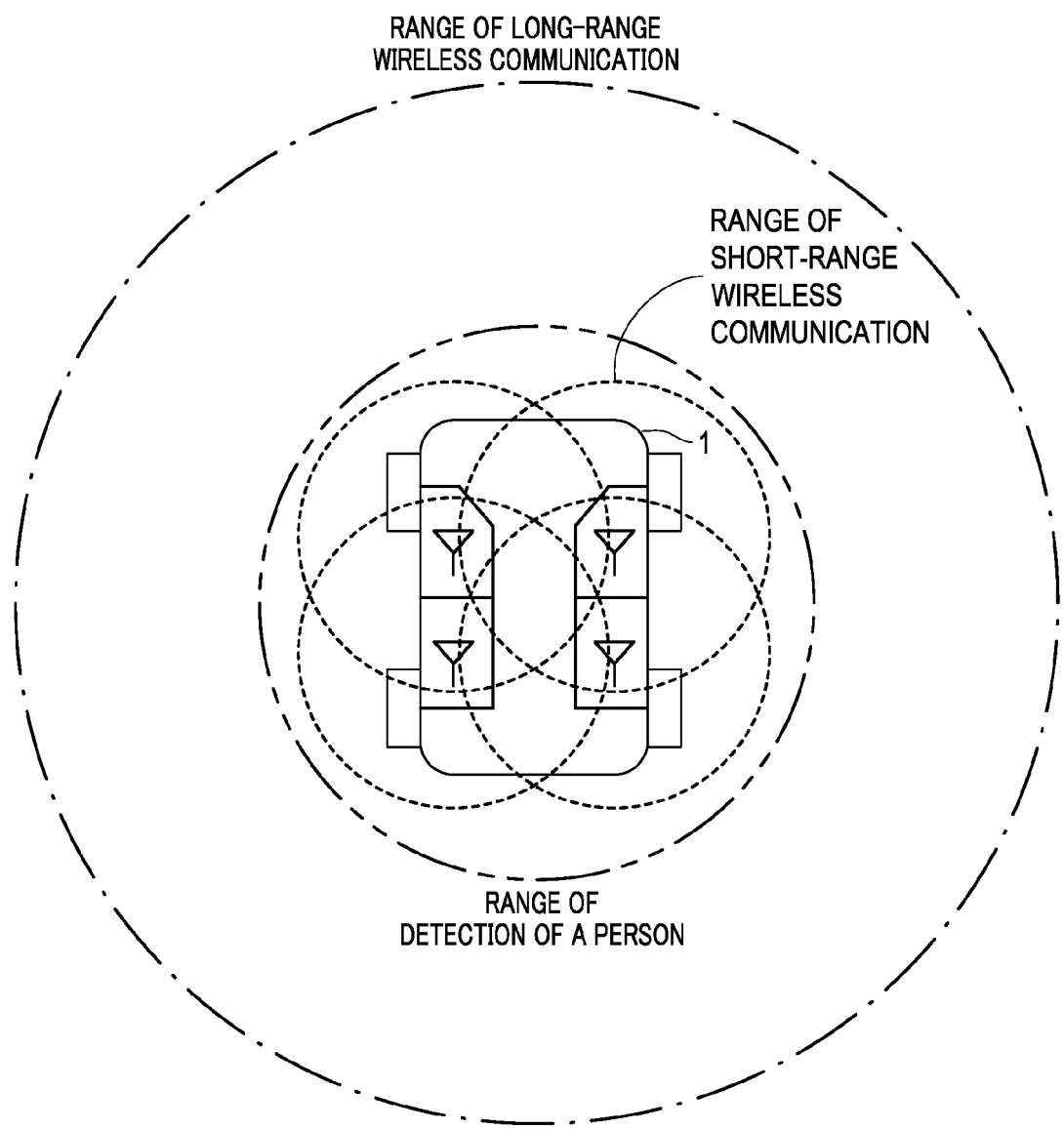
FIG. 7 is a schematic diagram for describing the door lock control performed by the vehicle door lock controller according to Embodiment 2.

FIG. 7 is a schematic diagram for describing the door lock control performed by the vehicle door lock controller 10 according to Embodiment 2. In the door lock system according to Embodiment 2, four antennas 14a for short-range wireless communication are provided in four locations of the vehicle 1; the driver side door, the passenger side door, and the right and left back seat doors (the reference numeral 14a for the antennas is omitted from FIG. 7). The communication range of each antenna 14a is within several tens of centimeters to several meters around the door in which the antenna 14a is provided (see the four broken line circles in FIG. 7). Moreover, the communication ranges of the four antennas 14a cover different areas although partially overlapping with each other.

After receiving an unlock request from the wireless key 5 at the long-range wireless communication unit 15, the control unit 11 of the vehicle door lock controller 10 according to Embodiment 2 successively uses the four antennas 14a to wirelessly communicate with the wireless key 5 through the short-range wireless communication unit 14. The control unit 11 determines which door(s) of the vehicle 1 are to be automatically locked after being unlocked and the lapse of a timeout period, depending on whether or not short-range wireless communication has been established between the control unit 11 and the wireless key 5 through each antenna 14a.

FIG. 8 is a table for describing the door lock control performed by the vehicle door lock controller 10 according to Embodiment 2. In this example, the vehicle door lock controller 10 controls the driver side door differently from the other doors. If short-range wireless communication has been established between the short-range wireless communication unit 14 and the wireless key 5 through the antenna 14a provided on the driver side door of the vehicle 1, the control unit 11 of the vehicle door lock controller 10 determines that the driver side door is to be automatically locked after being unlocked and the lapse of a timeout period regardless of whether or not short-range wireless communication has been established through the antenna 14a provided on any other door. It should be noted that the timeout period for this case is set to the long period since short-range wireless communication is established as shown in FIG. 4.

Moreover, if short-range wireless communication has not been established through the antenna 14a provided on the driver side door and if short-range wireless communication has been established through the antenna 14a provided on a different door, the control unit 11 determines that all the doors of the vehicle 1 are to be automatically locked after being unlocked and the lapse of a timeout period. The timeout period for this case is set to the long period since short-range wireless communication has been established as shown in FIG. 4. Moreover, the control unit 11 likewise determines that all the doors are to be automatically locked after being unlocked and the lapse of a timeout period if no short-range wireless communication has been established through any of the antennas 14a. However, since short-range wireless communication has not been established, the timeout period for this case is set to the medium-length or short period depending on the result of the detection by the human detection sensor 2.

The vehicle door lock controller 10 configured as described above according to Embodiment 2 is provided with a plurality of antennas 14a for short-range wireless communication so as to communicate wirelessly with the wireless key 5 within a short range, for example, by successively using the antennas 14a. The plurality of antennas 14a are provided on the driver side door, the passenger side door, and the right and left back seat doors. The communication ranges of the antennas 14a for short-range wireless communication are different from each other as shown in FIG. 7. This allows for determination of the location of the wireless key 5 depending on through which antenna 14a short-range wireless communication has been established, making it possible to determine which door the user carrying the wireless key 5 is located close to.

The vehicle door lock controller 10 according to Embodiment 2 determines which door(s) to be unlocked and automatically locked at a later time, depending on through which antenna 14a short-range wireless communication has been established between the vehicle door lock controller 10 and the wireless key 5. For example, if short-range wireless communication has been established between the vehicle door lock controller 10 and the wireless key 5 though the antenna 14a provided on the driver side door, the vehicle door lock controller 10 determines that the driver side door is to be controlled. Moreover, if short-range wireless communication has not been established through the antenna 14a provided on the driver side door and if short-range wireless communication has, the vehicle door lock controller 10 determines that all the doors of the vehicle 1 are to be controlled. In this way, the vehicle door lock controller 10 can determine that the door(s) appropriate for the location of the user carrying the wireless key 5 are to be controlled; for example, if the user performs an unlock operation in the vicinity of the driver side door, only the driver side door is to be unlocked, thus increasing the security performance of the vehicle 1.

It should be noted that although Embodiment 2 is configured to have four antennas 14a for short-range wireless communication onboard the vehicle 1, it is not limited to this; three or less or five or more antennas 14a may be provided onboard the vehicle 1. Moreover, the antennas 14a may not have to be provided on the doors of the vehicle 1 but may be provided elsewhere. For example, an additional antenna 14a may be provided on the door of the boot of the vehicle 1 so as to make it possible to determine whether or not the user carrying the wireless key 5 is in the vicinity of the boot. As a further example, two antennas 14a may be provided on the right and left sides of the vehicle 1 so as to make it possible to determine on which side of the vehicle 1 the user is located.

Although the vehicle door lock controller 10 is configured to control the driver side door differently from the other doors, it is not limited to this. For example, each of the driver side door, the passenger side door, and the right and left back seat doors may be controlled independently. In this case, the vehicle door lock controller 10 may be configured to determine that the door with the antenna 14a through which short-range wireless communication has been established with the wireless key 5 is to be controlled.

Moreover, as the vehicle door lock controller 10 according to Embodiment 2 is otherwise configured identically to the vehicle door lock controller 10 according to Embodiment 1, like parts are designated by like reference numerals and detailed description thereof are omitted.

The invention claimed is:

1. A vehicle lock controller, comprising:
  a short-range wireless communicator configured to communicate with a portable wireless communication device within a short range;
  a long-range wireless communicator configured to communicate with the wireless communication device within a long range, the long range being longer than the short range;
  a controller configured to lock or unlock at least one door of a vehicle in response to a lock or unlock request received from the wireless communication device;
  a detection device configured to detect the presence of a person around the vehicle; and
  a lock time setting device configured, when a request to unlock the at least one door is received from the wireless communication device, to set a lapse of time before the at least one door is locked, depending on whether or not (i) the short-range wireless communicator has communicated with the wireless communication device, (ii) the long-range wireless communicator has communicated with the wireless communication device, and (iii) a result of detection by the detection device, wherein:
  the controller is configured such that, when the controller receives the unlock request from the wireless communication device, the controller unlocks the at least one door and then locks the at least one door after the lapse of time set by the lock time setting device; and
  the lock time setting device:
    sets the lapse of time before the at least one door is locked to a long period when the short-range wireless communicator has communicated with the wireless communication device;
    sets the lapse of time before the at least one door is locked to a medium-length period shorter than the long period when (i) the short-range wireless communicator has not communicated with the wireless communication device, (ii) the long-range wireless communicator has communicated with the wireless communication device, and (iii) the detection device has not detected a person; and
    sets the lapse of time before the at least one door is locked to a short period shorter than the medium period when (i) the short-range wireless communicator has not communicated with the wireless communication device, (ii) the long-range wireless communicator has communicated with the wireless communication device, and (iii) the detection device has detected a person.

2. The vehicle lock controller according to claim 1, wherein the range within which the detection device detects a person is narrower than the long range of the long-range wireless communicator.

3. A vehicle lock controller, comprising:
  a short-range wireless communicator configured to communicate with a portable wireless communication device within a short range;
  a long-range wireless communicator configured to communicate with the wireless communication device within a long range, the long range being longer than the short range;
  a controller configured to lock or unlock at least one door of a vehicle in response to a lock or unlock request received from the wireless communication device;
  a detection device configured to detect the presence of a person around the vehicle; and
  a lock time setting device configured, when a request to unlock the at least one door is received from the wireless communication device, to set a lapse of time before the at least one door is locked, depending on whether or not (i) the short-range wireless communicator has communicated with the wireless communication device, (ii) the long-range wireless communicator has communicated with the wireless communication device, and (iii) a result of detection by the detection device, wherein:
  the controller is configured such that, when the controller receives the unlock request from the wireless communication device, the controller unlocks the at least one door and then locks the at least one door after the lapse of time set by the lock time setting device;
  the vehicle lock controller further comprises a setting reception device configured to receive a setting of whether or not to lock the at least one door after the lapse of time; and the controller is further configured to:
not lock the at least one door, even after the lapse of time, when the setting reception device has received a setting to not lock the at least one door; and
lock the at least one door after the lapse of time when the setting reception device has received a setting to lock the at least one door.

4. A vehicle lock controller, comprising:
a short-range wireless communicator configured to communicate with a portable wireless communication device within a short range;
a long-range wireless communicator configured to communicate with the wireless communication device within a long range, the long range being longer than the short range;
a controller configured to lock or unlock at least one door of a vehicle in response to a lock or unlock request received from the wireless communication device;
a detection device configured to detect the presence of a person around the vehicle; and
a lock time setting device configured, when a request to unlock the at least one door is received from the wireless communication device, to set a lapse of time before the at least one door is locked, depending on whether or not (i) the short-range wireless communicator has communicated with the wireless communication device, (ii) the long-range wireless communicator has communicated with the wireless communication device, and (iii) a result of detection by the detection device, wherein:
the controller is configured such that, when the controller receives the unlock request from the wireless communication device, the controller unlocks the at least one door and then locks the at least one door after the lapse of time set by the lock time setting device;
the vehicle lock controller further comprises a door open determination device configured to determine whether or not a door of the vehicle has been opened (i) after the controller unlocked the at least one door in response to the unlock request from the wireless communication device and (ii) before the lapse of time set by the lock time setting device; and
the controller is configured to not lock the at least one door after the lapse of time when the door open determination device determines that the door of the vehicle has been opened.

5. A vehicle lock controller, comprising:
a short-range wireless communicator configured to communicate with a portable wireless communication device within a short range;
a long-range wireless communicator configured to communicate with the wireless communication device within a long range, the long range being longer than the short range;
a controller configured to lock or unlock at least one door of a vehicle in response to a lock or unlock request received from the wireless communication device;
a detection device configured to detect the presence of a person around the vehicle; and
a lock time setting device configured, when a request to unlock the at least one door is received from the wireless communication device, to set a lapse of time before the at least one door is locked, depending on whether or not (i) the short-range wireless communicator has communicated with the wireless communication device, (ii) the long-range wireless communicator has communicated with the wireless communication device, and (iii) a result of detection by the detection device, wherein:
the controller is configured such that, when the controller receives the unlock request from the wireless communication device, the controller unlocks the at least one door and then locks the at least one door after the lapse of time set by the lock time setting device;
the short-range wireless communicator includes a plurality of antennas configured to transmit and receive a wireless signal;
each of the plurality of antennas is disposed in a different location of the vehicle; and
the controller is configured to determine which of a plurality of doors of the vehicle is to be controlled depending on through which of the plurality of antennas short-range wireless communication has been carried out between the short-range wireless communicator and the wireless communication device.

6. The vehicle lock controller according to claim 5, wherein:
the plurality of antennas are provided on the plurality of doors of the vehicle; and
depending on whether or not short-range wireless communication has been carried out between the short-range wireless communicator and the wireless communication device through a said antenna provided on a driver side door of the vehicle, the controller is configured to determine whether only the driver side door or the plurality of doors are to be controlled.

7. The vehicle lock controller according to claim 6, wherein the controller:
controls only the driver side door of the vehicle when the short-range wireless communication has been carried out through the said antenna provided on the driver side door of the vehicle; and
controls the plurality of doors when the short-range wireless communication has been carried out through only another of the plurality of antennas.

* * * * *